Patented Oct. 5, 1937

2,094,590

UNITED STATES PATENT OFFICE 2,094,590

METHOD OF TREATING CHINA-WOOD OIL

Lawrence A. Donovan, Chicago, and Elmer A. Daniels, Hinsdale, Ill.

No Drawing. Application November 10, 1934, Serial No. 752,464

1 Claim. (Cl. 87—12)

This invention relates to a method of treating China-wood oil whereby it is converted into a non-drying oil having properties which make it especially desirable for use in nitrocellulose lacquers. It is a continuation in part of our co-pending application entitled "Method of treating China wood oil", Serial No. 707,780, filed January 22, 1934.

We have found that if China-wood oil is first reacted with sulphur or a sulphur compound such as sulphur monochloride ($S_2Cl_2$) or the like at an elevated temperature and is then blown with oxygen or an oxygen containing gas that the product has properties which make it much more desirable for use in nitrocellulose lacquers than ordinary blown oils.

It is therefore an object of this invention to provide a method of treating China-wood oil with sulphur or a sulphur containing compound and oxygen whereby it is rendered non-drying.

It is a further object of this invention to provide an improved China-wood oil for use in nitrocellulose lacquers.

Other and further objects of this invention will be apparent from the following specification and the accompanying claim.

The first step in our new process is the reacting of the China-wood or tung oil with sulphur, selenium, or mixtures of sulphur and selenium or compounds of sulphur such as sulphur monochloride or the like. However, we prefer to use free sulphur in our process. We prefer that the percentage of sulphur or sulphur bearing compound used be less than 1% by weight of the tung oil being treated. We have found that one part of sulphur to four hundred parts of drying oil by weight gives excellent results but the proportions may be varied between one part of sulphur to one hundred and one parts of sulphur to eighteen hundred parts of tung oil by weight.

After mixing the oil and the sulphur or sulphur compound, the mixture is heated to a temperature between 250 and 400° C. The exact upper limit to which the heating can be carried will be determined by the boiling point or decomposition point of the tung oil used. The reaction between the oil and sulphur or sulphur compound will ordinarily be completed by the time the mass has reached the elevated temperature, say in 30 to 40 minutes.

After the sulphur treatment is completed, air or other oxygen containing gas is blown through the oil. This causes a rise in temperature which is due to the chemical reaction between the treated oil and the oxygen of the gas employed. Ordinarily, the blowing process will be complete within one-half hour, usually in a much shorter period.

The following will serve as examples to illustrate preferred embodiments of our invention:

Example 1

1 part by weight of sulphur is added to 900 parts by weight of China-wood oil and the mixture is heated without blowing, over a period of about 20 minutes up to a temperature of 280° C. Heating is then discontinued and air is blown through the heated oil for a period of about 15 minutes.

Example 2

1 part of sulphur is added to 600 parts by weight of China-wood oil and the mixture is heated, without blowing, over a period of about 35 minutes up to a temperature of 250° C., which temperature is maintained for 15 minutes. Air is then introduced into the oil mass for a period of about 1 hour.

Example 3

1 part by weight of sulphur is added to 400 parts by weight of China-wood oil and the mixture heated gradually without blowing to 325° C., at which temperature it is held for 10 to 30 minutes. Thereafter, air is blown into the heated oil for 5 to 30 minutes, while maintaining the temperature of the oil at about 330° C. Upon cooling, the treated oil is found to have the desirable properties aforementioned.

Example 4

1 part by weight of sulphur is added to 400 parts by weight of China-wood oil and the mixture heated gradually without blowing to 350° C. at which temperature it is held for 10 to 30 minutes. Thereafter, air is blown into the heated oil for 3 to 10 minutes, while maintaining the temperature of the oil at about 350° C. Upon cooling, the treated oil is found to have the desirable properties aforementioned.

We have found that when tung oil is treated as above described, it is converted into a non-drying oil. The drying properties of the oil are removed during the initial treatment with sulphur and do not reappear during the blowing process. When China-wood oil, treated as described above, is employed in the manufacture of nitrocellulose lacquers, we have found that the resulting lacquers are very superior to those produced by means previously known in that when subsequent coats of the lacquer are applied over an original coat, no lifting or wrinkling is observed.

Actual tests on China-wood oil have shown the following:

|  | Acid No. | Iodine No. |
|---|---|---|
| Sample before treatment | 2.1 | 170 |
| Sample after treatment with sulphur but before blowing | 4.7 | 87.2 |
| Sample after blowing | 10.1 | 77.6 |

To determine when the blowing period is complete, the oil may be tested for its compatibility with nitrocellulose lacquers. If compatible, and its physical properties are otherwise satisfactory, the blowing of the oil is discontinued.

Another great advantage of our treated tung oil is that it is compatible with nitrocellulose lacquer and that nitrocellulose of six seconds viscosity or above may be employed with it. This has not been practical with methods of preparing nitrocellulose lacquers previously known. In addition, our lacquer will dry to a hard, smooth film which is unusually resistant to abrasion.

The non-volatile ingredients of our lacquer may comprise nitrocellulose, an additional resin, such as ester gum or dammar gum, preferably dewaxed dammar gum, and our processed China-wood oil. The proportions in which these substances are employed may vary over a wide range but the following specific examples are illustrative of proportions which we have found to be entirely satisfactory:

*Non-volatile constituents*

*Example 1.—*     Percent by weight
Nitrocellulose (5 to 6 sec.) _____ 20
Processed China-wood oil _____ 40
Maleic acid hardened ester gum _____ 40

*Example 2.—*     Percent by weight
Nitrocellulose (½ sec.) _____ 35
Processed China-wood oil _____ 35
Hard resin _____ 30

*Example 3.—*     Percent by weight
Nitrocellulose (½ sec.) _____ 40
Processed China-wood oil _____ 34
Hard resin _____ 25
Dibutyl phthalate _____ 1

*Example 4.—*     Percent by weight
Carbon black _____ 7.0
Nitrocellulose (½ sec.) _____ 49.5
Processed China-wood oil _____ 31.1
Hard resin _____ 12.4

Any suitable plasticizing agent such as dibutyl phthalate or tricresyl phosphate may be employed in the foregoing formulae.

The solvents used in the preparation of the lacquer containing our processed China-wood oil may be variously prepared. When the lacquer is to be applied by brushing, the following formula in which parts by weight are given has proven satisfactory:

Percent by weight
Butyl acetate _____ 10
Butyl alcohol _____ 10
Amyl acetate _____ 15
No. 30 petroleum thinner _____ 25
Toluol _____ 30
Turpentine _____ 10

A formula for a solvent which has produced very good results in a spraying lacquer is as follows:

Parts by volume
Butyl alcohol _____ 9
Butyl acetate _____ 20
Toluol _____ 53
Ethyl acetate _____ 5
Anhydrous ethyl alcohol _____ 5
Petroleum distillate (having an evaporation rate substantially the same as toluol) _____ 8

We are aware that numerous details of the process may be varied through a wide range without departing from the principles of this invention, and we, therefore, do not purpose limiting the patent granted hereon otherwise than necessitated by the prior art.

We claim as our invention:

The method of treating China-wood oil, which comprises adding to China-wood oil not more than 1% by weight of sulphur to prevent jellification of the oil in the subsequent treatment of the oil, heating said oil in the presence of said sulphur to a temperature of at least 250° C. for a sufficient length of time to convert said China-wood oil into a non-drying oil and thereafter passing air through said oil to render said oil compatible with the usual ingredients of a nitrocellulose lacquer.

LAWRENCE A. DONOVAN.
ELMER A. DANIELS.